Sept. 25, 1962 W. F. RAGLAND ET AL 3,055,668
PACKING CARTRIDGE FOR STUFFING BOXES
Filed Aug. 18, 1960 2 Sheets-Sheet 1
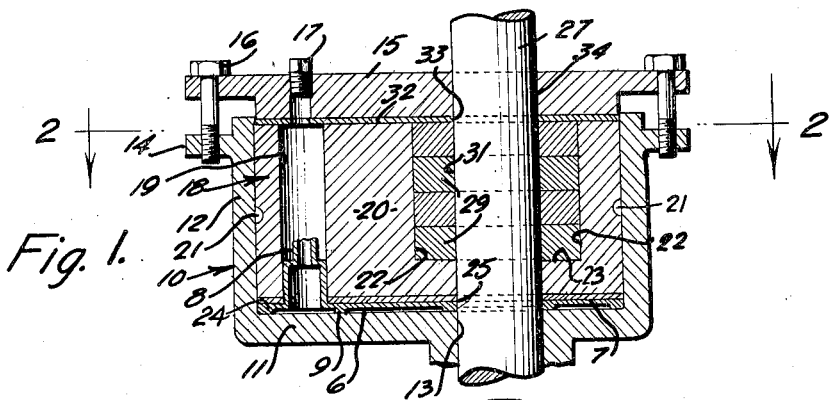
Fig. 1.
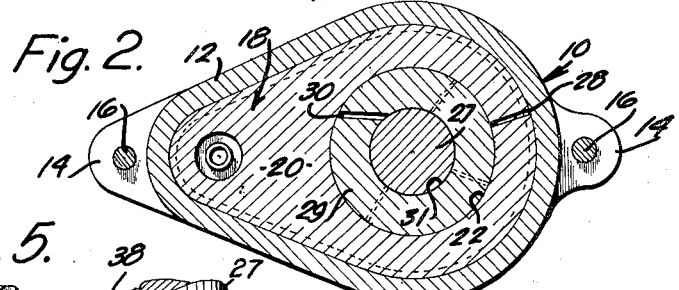
Fig. 2.
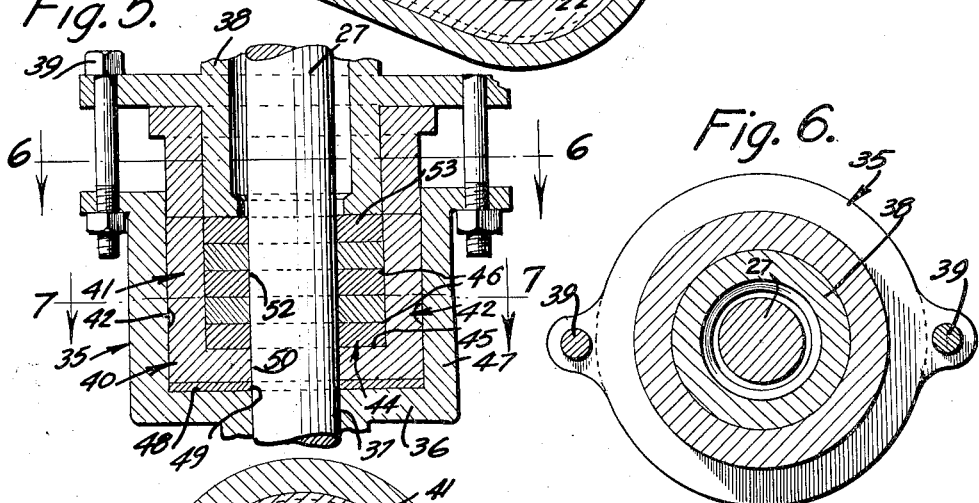
Fig. 5.
Fig. 6.
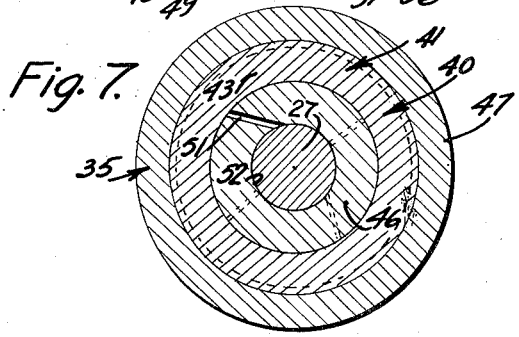
Fig. 7.
INVENTORS
William F. Ragland, &
Joseph C. Palmer.
BY
Victor J. Evans &Co.
Attorneys Sept. 25, 1962   W. F. RAGLAND ET AL   3,055,668
PACKING CARTRIDGE FOR STUFFING BOXES
Filed Aug. 18, 1960   2 Sheets-Sheet 2
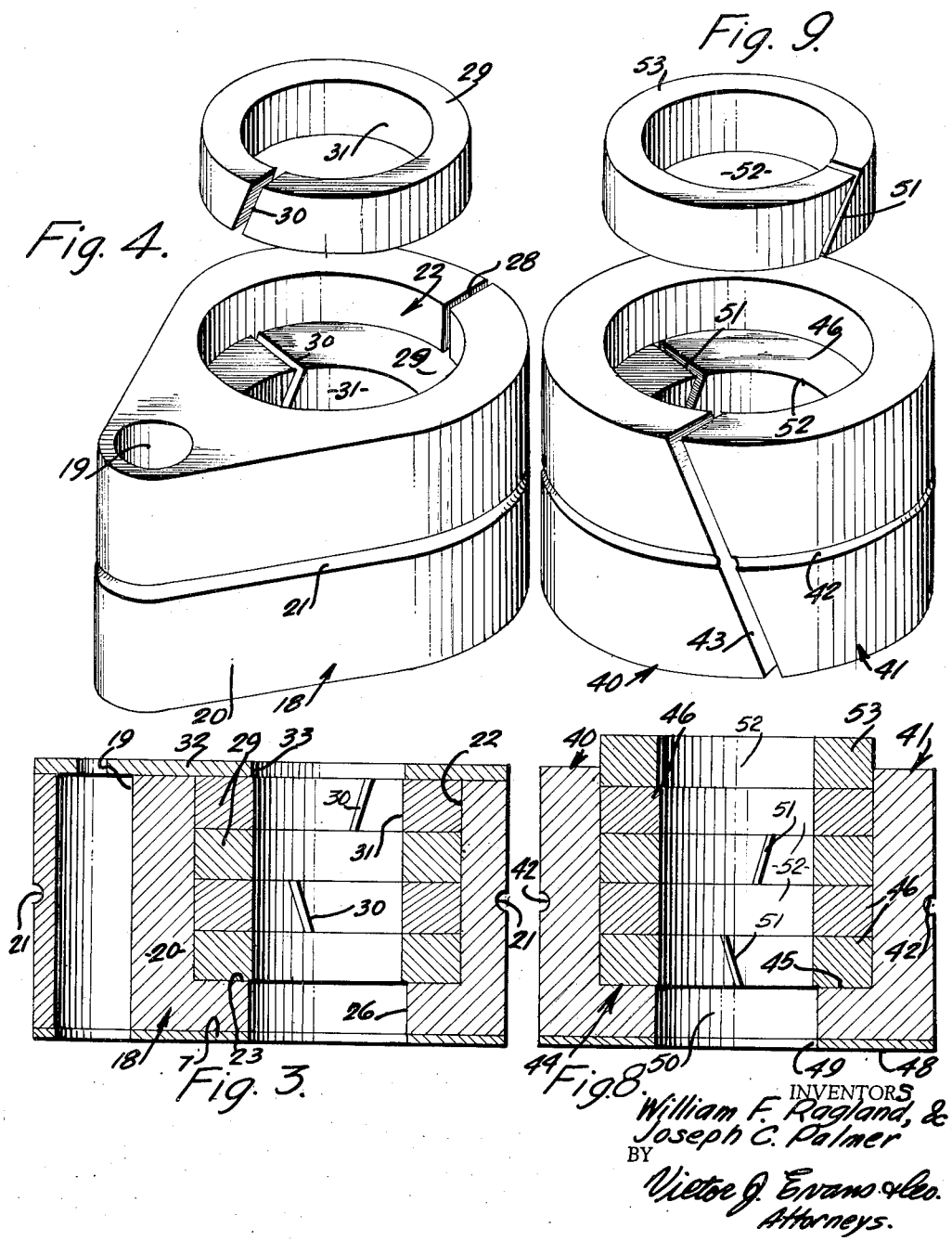
INVENTORS
William F. Ragland, &
Joseph C. Palmer
BY
Victor J. Evans & Co.
Attorneys.

United States Patent Office 3,055,668

Patented Sept. 25, 1962

3,055,668

PACKING CARTRIDGE FOR STUFFING BOXES

William F. Ragland, Box 9126, and Joseph C. Palmer, 611 Dumble, both of Houston, Tex.

Filed Aug. 18, 1960, Ser. No. 50,396
1 Claim. (Cl. 277—119)

This invention relates to stuffing boxes, and more particularly to an improved cartridge for stuffing boxes.

The object of the invention is to provide cartridges for use with stuffing boxes wherein the job of changing the packing in the stuffing box is greatly facilitated or speeded up.

Another object of the invention is to provide a cartridge for stuffing boxes wherein the cartridge will serve to seal the stuffing box more easily and more efficiently than other prior similar devices, and wherein the cartridge of the present invention is adaptable to either circular or non-circular stuffing boxes as desired.

A further object of the invention is to provide a packing cartridge for stuffing boxes which is extremely simple and inexpensive to manufacture.

Other objects and advantages will be apparent during the course of the following description.

In the accompanying drawings, forming a part of this application, and in which like numerals are used to designate like parts throughout the same:

FIGURE 1 is a sectional view showing a cartridge in a stuffing box and with a rod such as a polish rod extending therethrough.

FIGURE 2 is a sectional view taken on the line 2—2 of FIGURE 1.

FIGURE 3 is a sectional view taken through the cartridge, and showing certain of the parts in assembled position.

FIGURE 4 is a perspective view of the cartridge for the stuffing box, with certain of the parts separated, the device of FIGURE 4 being non-circular.

FIGURE 5 is a sectional view illustrating a modification wherein the stuffing box and cartridge have a circular formation.

FIGURE 6 is a sectional view taken on the line 6—6 of FIGURE 5.

FIGURE 7 is a sectional view taken on the line 7—7 of FIGURE 5.

FIGURE 8 is a sectional view illustrating the circular cartridge.

FIGURE 9 is a view in perspective illustrating the cartridge of FIGURE 8, and showing certain of the parts separated.

Referring in detail to the drawings, and more particularly to FIGURES 1 through 4 of the drawings, the numeral 10 indicates a stuffing box of non-circular formation which includes a wall member 11 as well as a wall portion 12, and the wall portion 12 is of non-circular formation, as for example as shown in FIGURE 2. The wall member 11 is provided with an aperture 13 therein, and the numeral 15 indicates a head which is clamped or connected to lugs 14 on the wall portion 12 as for example by means of securing elements or bolts 16. The head 15 is provided with a removable plug 17 which can be disconnected or removed from the head 15 as for example when lubrication is to be placed in the bore 19, of the cartridge 18.

As shown in the drawings the cartridge 18 includes a main body portion 20 which is of non-circular formation and which conforms in configuration or shape to the wall portion 12, as for example as shown in FIGURE 2. There is provided in the outer portion of the main body member 20 a continuous groove 21, for a purpose to be later described. The member 20 is provided with a cutaway portion or recess 22 which defines in the lower portion thereof a shoulder 23, and the numeral 24 indicates a spacer which is arranged adjacent the upper surface of the wall member 11, and the spacer 24 is provided with an aperture 25 which registers with the aperture 13 in the wall member 11. The spacer 24 is provided with depending ridges 9 and there is an upstanding standpipe 8 of conventional construction which is arranged in the bore 19, and the numeral 6 indicates the space below the member 24 whereby as the rod 27 moves up and down, a small amount of oil can move or pass through an aperture such as the aperture 13, and into the space 6 defined between the ridges 9, and this oil can then flow upwardly through the standpipe 8 and through the bore 19 in order to lubricate the entire unit. The shoulder 23 is provided with a circular opening or aperture 26 for the projection therethrough of a rod such as the polish rod 27.

The member 20 is provided with a split or slit 28, FIGURE 2. Seated in the recessed portion 22 of the body member 20 is a plurality of packing members 29 of circular formation, and these packing members 29 are each provided with an inclined slit or split 30, and there is provided in each of the packing members 29 an enlarged circular opening or space 31. The numeral 32 indicates a plate or retainer which is arranged adjacent the top of the cartridge 18, and the plate 32 is provided with an opening 33 that registers with the openings 31, and the opening 33 also registers with an opening 34 in the head 15 whereby the polish rod 27 can extend through these registering openings, as for example as shown in FIGURE 5.

Referring now to FIGURES 5, 6, 7, 8 and 9 of the drawings, there is illustrated a modification wherein the numeral 35 indicates a modified stuffing box which includes a wall member 36 that is provided with an aperture 37 therein for the projection therethrough of a polish rod such as the rod 27, and the stuffing box 35 further includes a circular wall portion 47. A spacer 48 is positioned within the lower portion of the wall 47, and the spacer 48 is provided with an aperture 49 that registers with the aperture 37, and as shown in FIGURE 5 there is provided a head 38 which is adapted to be clamped to the wall portion 47, in any suitable manner, as for example by means of securing elements 39.

The numeral 40 indicates a cartridge which includes a circular body member 41 that snugly fits in the circular wall portion 47, and the body member 41 is provided with a continuous groove 42 in its outer periphery, as for example as shown in FIGURE 5. The body member 41 is also provided with an inclined split or slit 43, FIGURE 7. The lower portion of the body member 41 is provided with a shoulder 45 which is defined by a recess 44 in the body member 41, and a plurality of circular packing members 46 are seated in the recess 44. The packing members 46 are each provided with inclined slits 51, FIGURE 7, and the shoulder 45 is provided with an aperture 50 which registers with the apertures 49 and 37. The apertures or openings in the packing members 46 are indicated by the numeral 52. The numeral 53 indicates a junk ring which is arranged above the uppermost packing member 46.

From the foregoing, it is apparent that there has been provided a cartridge for stuffing boxes, and as shown in FIGURES 1 through 4, the present invention is shown for use with an oval type stuffing box. In FIGURES 5 through 9 a round type stuffing box is illustrated. As shown in FIGURES 1 through 4 an oval or non-circular stuffing box 10 is shown and wherein the cartridge 18 is shown in the stuffing box for use with the rod such as the polish rod 27 whereby leakage will be prevented. In the circular stuffing box 35 of FIGURES 5 through 9, the cartridge 40 is used and the numeral 27 again indicates the polish rod which extends through the stuffing box and through the cartridge.

The cartridge provides a means whereby ring type packing members such as the packing members 29 or 46 can be adapted or used with the oval or Ratigan stuffing boxes, and these packing members 29 and 46 may be made of a suitable material such as asbestos impregnated with a suitable material such as Teflon, and the cartridge can be used with a round or Hercules stuffing box. In actual practice, solid rubber packing members or cone shaped packing members are used in the previously named stuffing boxes, but heretofore cartridges of this type have not been made to fit these boxes. In the oval type or Ratigan stuffing box, as indicated by the numeral 10, in actual practice bronze spacer members or plates such as the spacer members 7 and 24 are dropped into the bottom of the stuffing box, or as shown in FIGURES 5 through 9 a spacer 48 is used for the unit 40, and then the cartridge 18 or 40 is positioned on top of the bronze plate or spacer, whereas all other packings use the bronze spacer or plate in between their packing members. With the present invention, the pumpers or other personnel will have an easier job in changing packing in the stuffing box.

The groove 21 or the groove 42 which is arranged around the outside of the cartridge serves to weaken the cartridge at the middle so as to seal the outside of the box more easily. The cartridges are adapted to be made of a suitable material such as suitable rubber like material with graphite included in the rubber compound. The cartridge of the present invention will serve to seal the stuffing box much more easily than previous devices which have been available.

In the non-circular stuffing box of FIGURES 1 through 4, the cartridge is indicated by the numeral 18 and the cartridge is recessed as at 22 and there is provided a plurality of packing members 29 which have openings 31 which register with openings 26, 25 and 33 so that the polish rod 27 can move or extend therethrough. The packing members 29 rest on the shoulder 23, and the bore 19 may receive lubrication from any suitable source so as to minimize friction between the polish rod and the adjacent parts or surfaces. The plug 17 can be removed when the lubrication is being inserted in the bore or space 19.

In the round type stuffing box 35, the plurality of packing members 46 are arranged on the shoulder 45, and the junk ring 53 is arranged above the uppermost packing member 46. By tightening the securing elements or bolts such as the bolts 16 or 39, pressure on the packing members can be increased as desired. When the packing members are to be moved or replaced, these bolts or securing elements can be unscrewed so that the head can be removed from the stuffing box whereby the packing can then be readily removed and replaced.

The parts can be made of any suitable material and in different shapes or sizes.

Minor changes in shape, size and rearrangement of details coming within the field of invention claimed may be resorted to in actual practice, if desired.

What is claimed is:

In a device of the character described, a stuffing box including a wall member provided with an aperture therein, said box further including a non-circular wall portion, apertured lugs on said wall portion, a head clamped to said lugs and said head having an aperture therein, a spacer and plate positioned within said box and arranged contiguous to the upper surface of said wall member, there being a plurality of spaced apart registering apertures in said spacer and plate registering with the aperture in the wall member, a rod extending through said registering apertures, a non-circular cartridge positioned in said box and including a body member conforming in configuration to the interior of the stuffing box, there being a bore in an end portion of said body member, said body member being provided with a split therein, there being a circular recess in said body member, a plurality of spaced apart split circular packing members positioned in the recess in said body member, and a plate interposed between said head and the top of the body member.

References Cited in the file of this patent
UNITED STATES PATENTS

| | | |
|---|---|---|
| 301,605 | Johns | July 8, 1884 |
| 483,013 | Pinch | Sept. 20, 1892 |
| 724,698 | Harder et al. | Apr. 7, 1903 |
| 1,045,088 | Wriedt | Nov. 19, 1912 |
| 2,692,152 | Tremdada | Oct. 19, 1954 |
| 2,845,286 | Case et al. | July 29, 1958 |